United States Patent [19]

Lee et al.

[11] Patent Number: 5,069,925

[45] Date of Patent: Dec. 3, 1991

[54] PREPARATION OF TEA PRODUCTS

[75] Inventors: Eldon C. Lee, New Milford; Ernest K. Gum, New Fairfield, both of Conn.

[73] Assignee: Nestec S.A., Vevey, Switzerland

[21] Appl. No.: 534,440

[22] Filed: Jun. 7, 1990

[51] Int. Cl.$^5$ .............................................. A23F 3/18
[52] U.S. Cl. ..................................... 426/597; 426/435
[58] Field of Search ................................ 426/597, 435

[56] References Cited

U.S. PATENT DOCUMENTS 4,508,745  4/1985  Fulger et al. .................. 426/432 X
4,668,525  5/1987  Creswick ....................... 426/435 X

OTHER PUBLICATIONS

Pintauro, Soluble Tea Production Process, 1970, Noyes Data Corp.: Park Ridge, N.J., pp. 1-2.

*Primary Examiner*—Joseph Golian
*Attorney, Agent, or Firm*—Vogt & O'Donnell

[57] ABSTRACT

To obtain increased yields of soluble solids extracted from tea leaves and to improve the flavor of extracts obtained by acid hydrolysis of spent tea residue obtained from aqueous extraction of tea leaves, spent tea residue is hydrolyzed with an acid catalyst at a temperature of from 170° C. to 250° C. and at a pressure of from 120 psig to 600 psig for a period of from 5 seconds to 120 seconds to obtain an extract.

9 Claims, No Drawings

PREPARATION OF TEA PRODUCTS

BACKGROUND OF THE INVENTION

The present invention relates to the preparation of tea products and more particularly to water soluble tea extracts prepared by acid hydrolysis of the spent tea residues formed during the hot aqueous extraction of tea leaves in the production of water soluble tea extracts.

The products of tea have been increasingly marketed in the form of water-soluble tea extracts, usually in the form of dry powders. Substantial research activity has been directed to improve the quality of tea beverage, having a flavour and colour as close as possible to that obtained by brewing tea leaves. Another aspect of soluble tea manufacturing is to increase the yield of tea soluble solids.

Methods of obtaining tea extracts from tea leaves using a series of countercurrent stages or a two-stage extraction are well-known. Temperatures of aqueous extraction vary from room temperature to elevated temperatures as high as 180° C. with elevated pressures.

However, the predominantly remaining spent tea, i.e., tea extraction residue material, is currently discarded.

In U.S. Pat. No. 4668525, a method is described for treating the spent tea leaf from a tea extraction process which comprises acidifying the spent tea leaf to reduce the pH to within the range of about 2.0 to 3.0 and subjecting the acidified spent tea leaf to further extraction with aqueous solvent at pressures of about 80–100 psig and temperatures of about 140°–170° C. for at least 4 minutes and separating the remaining tea leaf solids from the aqueous solvent to leave a high temperature / high pressure aqueous extract. However, the resulting extract was found to have an unacceptable bitter taste with a pruny off-flavour.

SUMMARY OF THE INVENTION

We have devised a method of hydrolysing spent tea solids in which the bitter taste and pruny off-flavour can be dramatically reduced in which the hydrolysis is carried out at a high temperature for a short time. It is thought that the formation of furfural is responsible for the pruny flavour and the bitter taste respectively, and the quantity of this compound formed in our process is dramatically reduced.

Accordingly, the present invention provides a process for the preparation of water-soluble tea extracts from spent tea residues formed during hot aqueous extraction of tea leaves in the production of water soluble tea extracts which comprises hydrolysing the said spent tea residues with an acid catalyst at a temperature from 170° to 250° C. and a pressure from 120 to 600 psig for a period of from 5 to 120 seconds.

DETAILED DESCRIPTION OF THE INVENTION

The spent tea residues and water-soluble tea extracts may be obtained by conventional methods by the hot aqueous extraction of black or green tea leaves, for instance, using a series of countercurrent stages or a two-stage extraction. Temperatures of the aqueous extraction may vary from room temperature to up to 180° C. or more with elevated pressures.

The spent tea residues may be dehydrated and are preferably ground before the hydrolysis for instance to an average particle size of from 0.05 to 2.0 millimeters.

The hydrolysis of the spent tea residues is advantageously carried out in a plug flow reactor. The principle of a plug flow reactor is described in Ind.Eng.Chem.-Prod.Res.Dev., 18(3): 166(1979) by D. R. Thompson and H. E. Grethlein, "Design and Evaluation of a Plug Flow Reactor for Acid Hydrolysis of Cellulose". Basically, it comprises a slurry tank, a pump, a heating unit, an acid injection unit, a reactor tube, a heat exchanger and instrumentation for temperature control.

The acid used is conveniently a strong food grade quality acid such as HCl, $HNO_3$, $H_2SO_4$, $H_3PO_4$, $CH_3COOH$ or citric acid. $H_2SO_4$ and $H_3PO_4$ are preferred. The amount of acid used may be from 0.01 to 15%, preferably from 0.1 to 2.0% and especially from 0.25 to 1.5% by weight of concentrated acid based on the weight of the spent tea residue.

The temperature of the reaction is preferably from 180° C. to 240° C., the pressure is preferably from 150 to 500 psig, and the duration of the process is preferably from 10 to 90 seconds.

The aqueous extract containing acid hydrolysate may then be separated from the insoluble residue conveniently by filtration. The acid hydrolysate may, if desired, be neutralised, preferably by means of calcium hydroxide, and then filtered to remove insoluble matter. Acids may also be removed by means of anion exchange resins.

The separated aqueous extract may be mixed with conventional aqueous tea extract, nature tea essence or enhancer. (Nature tea essences are those substances which are lost during evaporation and drying of tea extracts and are generally recovered by stripping and condensation, and added back into the tea concentrate before drying).

The separated aqueous extract may, if desired, be concentrated and spray dried to a moisture content of below 5%, preferably below 4% by weight.

EXAMPLES

The following Examples further illustrate the present invention.

EXAMPLES 1-5

Dehydrated black tea residue grounds containing 10% solids obtained from the hot aqueous extraction of black tea leaves in the production of water soluble tea extracts, were hydrolysed in a continuous Plug Flow tubular reactor in the presence of the acid catalysts at the concentrations, temperatures and residence times indicated in Table I below:

TABLE I

| Example | Acid % | Temp. °C. | Time (secs) | Yield % | Furfural % (%/tea soluble solids) |
|---|---|---|---|---|---|
| 1 | Sulphuric 1 | 240 | 10 | 20 | 0.49 |
| 2 | Sulphuric 0.5 | 180 | 10 | 15 | 0.19 |
| 3 | Phosphoric 1 | 240 | 10 | 15 | 0.07 |
| 4 | Phosphoric 0.5 | 180 | 10 | 7 | 0.02 |
| 5 | Phosphoric 1 | 210 | 10 | 11 | 0.01 |

The hydrolysates were filtered and the filtered cake was then washed with deionised water. The filtrate was neutralised with Ca(OH)$_2$ and then filtered to remove the insoluble calcium salt of phosphate or sulphate.

The filtrate was substantially free of any bitter taste or pruny off-flavour and the amounts of furfural were low.

The filtrate was concentrated to 40-45% solids using an evaporator at 50° C. The concentrate of tea residue acid hydrolysate (10%) was blended with 35% by weight concentrate of tea aqueous extracts formed by conventional hot aqueous extraction containing 40-45% solids and tea essence and then spray dried at an inlet temperature of 150° C. and an outlet temperature of 95° C. using an Anhydro spray drier. The finished product was controlled to a moisture content of below 4%.

COMPARATIVE EXAMPLE

Dehydrated black tea residue grounds as used in the process of Examples 1-5 were hydrolysed in an autoclave batch reactor with 1% phosphoric acid at 190° C. for 10 minutes. The amount of furfural was 4.1% by weight based on the weight of the tea soluble solids and the product had a bitter taste with a pruny off-flavour.

We claim:

1. A process for obtaining water-soluble tea extracts comprising hydrolyzing spent tea residue, wherein the spent tea residue has been obtained from tea leaves extracted by a hot aqueous medium, with an acid catalyst at a temperature of from 170° C. to 250° C. at a pressure of from 120 psig to 600 psig for from 5 seconds to 120 seconds to obtain an extract and then separating the extract from insoluble residue.

2. A process according to claim 1 wherein the acid catalyst is in an amount of from 0.01% to 15% by weight of concentrated acid based on the weight of the spent tea residue.

3. A process according to claim 1 wherein the acid cataylst is in an amount of from 0.1% to 2% by weight of concentrated acid based upon the weight of the spent tea residue, the temperature is from 180° C. to 240° C., the pressure is from 150 psig to 500 psig and wherein the spent tea leaves are hydrolyzed for from 10 seconds to 90 seconds.

4. A process according to claim 1 further comprising neutralizing the extract separated from the insoluble residue.

5. A process according to claim 1 further comprising mixing the extract separated from the insoluble residue with a tea product selected from the group of tea products consisting of aqueous tea extract, nature tea essence and tea enhancer.

6. A process according to claim 1 further comprising concentrating the extract separated from the insoluble residue and then spray drying the concentrated extract to obtain an extract having a moisture content of below 5% by weight.

7. A process according to claim 1 wherein the acid catalyst is selected from the group of acids consisting of HCl, HNO$_3$, H$_2$SO$_4$, H$_3$PO$_4$, CH$_3$COOH and citric acid.

8. A process according to claim 1 wherein the spent tea residue has a particle size of from 0.05 mm to 2 mm.

9. A process according to claim 1 wherein the spent tea residue is hydrolyzed in a plug flow reactor.

* * * * *